United States Patent
Edwards et al.

(10) Patent No.: US 11,274,570 B2
(45) Date of Patent: Mar. 15, 2022

(54) OIL TANK FILLING SYSTEM

(71) Applicant: Rolls-Royce plc, London (GB)

(72) Inventors: David A. Edwards, Derby (GB); Clare L. Bewick, Derby (GB); Samuel W. White, Derby (GB); William A. Malewicz, Derby (GB); Sebastian Ray, Derby (GB); Cristina Diaz Garcia, Derby (GB)

(73) Assignee: Rolls-Royce plc, London (GB)

(*) Notice: Subject to any disclaimer, the term of this patent is extended or adjusted under 35 U.S.C. 154(b) by 221 days.

(21) Appl. No.: 16/387,995

(22) Filed: Apr. 18, 2019

(65) Prior Publication Data

US 2019/0338673 A1     Nov. 7, 2019

(30) Foreign Application Priority Data

May 2, 2018   (GB) ..................... 1807202

(51) Int. Cl.
    *F01D 25/18*    (2006.01)
    *F01M 11/04*    (2006.01)
    (Continued)

(52) U.S. Cl.
    CPC ............. *F01D 25/18* (2013.01); *F01D 25/20* (2013.01); *F01M 11/0004* (2013.01);
    (Continued)

(58) Field of Classification Search
    CPC ..... F01D 25/18; F01D 25/20; F01M 11/0004; F01M 11/0458; F01M 11/12;
    (Continued)

(56) References Cited

U.S. PATENT DOCUMENTS 7,377,098 B2 * 5/2008 Walker ................... F01D 9/065
                                                       60/39.08
7,621,117 B2 * 11/2009 Dooley ..................... F02C 7/06
                                                       60/226.1
(Continued)

FOREIGN PATENT DOCUMENTS

DE    102011112254   3/2013
EP    2743477        6/2014

OTHER PUBLICATIONS

Search Report issued in connection with GB Patent Appl. No. 1807202,5 dated Sep. 27, 2018 (1 page).
(Continued)

*Primary Examiner* — Christopher R Legendre
(74) *Attorney, Agent, or Firm* — Simpson & Simpson, PLLC

(57) ABSTRACT

An oil tank filling system for filling the oil tank of a gas turbine engine that includes an aft core cowl. The system includes an oil tank that has an oil tank top and an oil tank bottom and is located within a core of the engine, an oil access port located on the aft core cowl, and an oil tank filling pipe that leads from the oil access port to a tank filling port located at or adjacent the oil tank bottom. The system is configured so that oil that is supplied to the oil access port flows to and into the oil tank using gravitational force. A method of filling the oil tank of a gas turbine engine and a gas turbine engine that includes the oil tank filling system.

7 Claims, 3 Drawing Sheets

(51) Int. Cl.
    *F01M 11/12* (2006.01)
    *F16N 7/02* (2006.01)
    *F02K 3/06* (2006.01)
    *F01D 25/20* (2006.01)
    *F01M 11/00* (2006.01)

(52) U.S. Cl.
    CPC ......... *F01M 11/04* (2013.01); *F01M 11/0458* (2013.01); *F01M 11/12* (2013.01); *F02K 3/06* (2013.01); *F01M 2011/0033* (2013.01); *F01M 2250/60* (2013.01); *F05D 2220/32* (2013.01); *F05D 2260/98* (2013.01); *F16N 7/02* (2013.01); *F16N 2210/02* (2013.01)

(58) Field of Classification Search
    CPC ....... F01M 2011/0033; F01M 2250/60; F01M 11/04; F05D 2220/32; F05D 2220/36; F05D 2260/98; F16N 7/00; F16N 2210/02; F16N 17/00; F16N 7/02
    USPC .................................. 141/95; 222/155, 156
    See application file for complete search history.

(56) References Cited

U.S. PATENT DOCUMENTS

| | | | |
|---|---|---|---|
| 7,966,965 B2* | 6/2011 | Pisseloup | F01D 25/18 116/227 |
| 8,627,667 B2 | 1/2014 | Lozier et al. | |
| 8,938,944 B2* | 1/2015 | Todorovic | B64D 33/10 60/267 |
| 9,194,294 B2 | 11/2015 | Suciu et al. | |
| 10,975,741 B2* | 4/2021 | Guillou | F01D 25/20 |
| 11,035,294 B2* | 6/2021 | Eichstadt | F02K 3/04 |
| 2008/0073154 A1* | 3/2008 | Eleftheriou | F01D 25/18 184/105.1 |
| 2008/0093173 A1* | 4/2008 | James | G01F 23/0076 184/6.11 |
| 2013/0291514 A1 | 11/2013 | Suciu et al. | |
| 2014/0010639 A1 | 1/2014 | Snape et al. | |
| 2014/0231437 A1 | 8/2014 | Snyder et al. | |
| 2015/0044028 A1* | 2/2015 | Lord | F01D 25/24 415/115 |
| 2015/0075132 A1 | 3/2015 | Kohn et al. | |
| 2017/0130606 A1* | 5/2017 | Niergarth | F02C 7/185 |
| 2019/0338673 A1* | 11/2019 | Edwards | F02C 7/06 |

OTHER PUBLICATIONS

Extended Search Report dated Sep. 20, 2019 in connection with European Patent Application No. 19166673, applicant Rolls-Royce plc (7 page).

\* cited by examiner

OIL TANK FILLING SYSTEM

CROSS-REFERENCE TO RELATED APPLICATIONS

This specification is based upon and claims the benefit of priority from United Kingdom patent application number GB 1807202.5 filed on May 2, 2018, the entire contents of which are incorporated herein by reference.

BACKGROUND

Field of the Disclosure

The present disclosure relates to an oil tank filling system. More particularly, the present disclosure provides an oil tank filling system that is useful for a gas turbine engine such as those used to power and propel large passenger aircraft. A method of filling the oil tank of a gas turbine engine and a gas turbine engine that includes the oil tank filling system are also disclosed.

Description of the Related Art

Gas turbine engine oil systems are in general full flow re-circulatory systems that must provide for adequate lubrication and cooling of all engine bearings, gears and drive splines under all foreseeable operating conditions.

Each gas turbine engine typically has an oil tank that supplies oil to the oil system of engine. The oil tank is typically filled through a securable opening in the tank. For turbo fan engines this opening is typically located on the fan case towards the front of the engine. For example for the Rolls-Royce® TRENT® 1000 engine, the oil tank is located on the left hand side of the fan case (viewed from the air intake). An oil filler cap is readily accessed by a maintenance engineer or service technician who mounts a set of steps with an oil can, removes the filler cap and simply pours oil from the oil can into the oil tank.

While that method is effective for those engines and many other engines, it is not suitable, or at least not favourable, for engines where broader design reasons require the oil tank to be located within the core engine. For example, the oil tank may be housed within an engine nacelle and is therefore generally inaccessible to a maintenance engineer with an oil can or it is unsafe or at least inconvenient to be accessed by a maintenance engineer. These problems are acute when the oil tank is located below one or more outlet guide vanes (OGV) on the top of the core engine where room is tight and access is restricted by the fan case and the outlet guide vanes.

Access is especially restricted within the core engine of large turbofan engines where the large size of the fan requires a large fan case. Furthermore large turbofan engines typically need to be geared, the gears need to remain lubricated and therefore large geared turbofan engines tend to require large oil tanks.

The safety of passengers, crew and also maintenance staff is paramount to the design and operation of gas turbine engines. Furthermore it is critical to the timely maintenance of a gas turbine engine that its oil system can be filled with oil in an efficient manner.

There is therefore a need to provide oil tank filling systems for filling oil tanks that are located in a part of the engine that is not readily accessible to maintenance engineers, for example within the core engine of a turbofan engine.

U.S. Pat. No. 9,194,294 B2 discloses a turbofan gas turbine aircraft engine that has an oil tank in a core compartment and an oil fill tube, sealable with a cap and sequestable under a cover, which is mounted to the fan case and is fluidly connected to the oil tank via a fluid conduit and a tube. The fluid conduit passes through a dry cavity in the flow exit guide vane. Alternatively oil from the oil fill tube flows through a wet cavity in the flow exit guide vane to reduce piping. The gas turbine engine requires a maintenance engineer with an oil can to fill the oil tank.

U.S. Pat. No. 8,627,667 B2 discloses a turbofan gas turbine aircraft engine that has a fluid tank structure that is integrated within a bypass duct. Oil is added to the tank via a fill tube. The engine requires a maintenance engineer with an oil can to pour oil in to the fill tube to fill the oil tank.

United States patent application US 2013/0291514 A1 discloses a gas turbine engine that has an oil tank that is arranged near the hot section of the engine, i.e. in the vicinity of the combustor section and the turbine section, to address packaging constraints. The oil tank is axially aligned with the compressor section and filled with oil through a fill tube mounted on an upper portion of the fan case and a tube that leads to the oil tank.

United States patent application US 2015/075132 A1 discloses an arrangement of an oil tank of an aircraft turbomachine. The oil tank is mounted at a distance from a pump to optimise space dedicated for the tank between an intermediate casing and a nacelle cowling. The tank can be filled by accessing via an aperture in a panel located on the upper portion of the nacelle cowling. The oil level in the tank can be visually determined from a gauge on the panel. A technician must reach high within a tight space in the engine to access an oil return connector.

The present disclosure provides an oil tank filling system that overcomes at least some of the above problems or at least a useful alternative to known oil tank filling systems.

SUMMARY

In a first aspect, there is provided an oil tank filling system for filling an oil tank of a gas turbine engine that includes an aft core cowl, the system comprising: an oil tank that has an oil tank top and an oil tank bottom and is located within a core of the engine; an oil access port located on the aft core cowl; and an oil tank filling pipe that leads from the oil access port to a tank filling port located at or adjacent the oil tank bottom; the system being configured so that oil that is supplied to the oil access port flows to and into the oil tank using gravitational force.

The system enables an oil tank of a gas turbine engine to be filled when that oil tank that is located in a part of the engine that is not readily accessible e.g. within the core engine, for example more particularly within the core engine of a turbofan within the periphery of the fan case. The aft core cowl is typically readily and safely accessible with sufficient space underneath the core cowl to accommodate oil piping. The system also enables the oil tank to be filled by a maintenance engineer whilst avoiding the potential hazards of raising the maintenance engineer above the core of the engine.

The oil tank may be shaped to curve around one or both sides of the engine within the core of the engine.

The oil tank may be located between opposing outlet guide vanes.

A sight viewing glass may be provided that shows or indicates the level of oil in the oil tank.

The sight viewing glass may be located to be visible through an access panel on the aft core cowl and may communicate with the oil tank filling pipe to visually alert when oil is backing up the oil filling tank pipe.

The sight viewing glass may be located to be visible through an access panel on the aft core cowl adjacent the oil access port and may communicate with the oil tank filling pipe so that the level shown through the sight viewing glass reflects that of the oil in the oil tank.

The oil access port and the sight viewing glass may be positioned to be outboard of a matrix cooler i.e. to take advantage of the cooler's presence to shield it from radiation from the core, more specifically casings of the core.

At least one oil sensor may be provided in or adjacent the oil tank communicates with an oil sensor controller that provides an alert when there is a predetermined volume of oil in the oil tank.

One or more temperature and/or pressure sensors may be provided alongside one or more sections of the oil tank filling pipe and may communicate with a controller to provide an alert should the oil tank filling pipe burst or become blocked.

The oil tank filling system may include an oil pump that may be active to pump oil through the oil tank filling pipe and the tank filling port and into the oil tank.

The oil tank filling system may include an oil pump controller that controls the operation of the oil pump in the filling of the oil tank.

In a second aspect, there is provided a method of filling an oil tank of a gas turbine engine that includes an aft core cowl, the method comprising the steps of: supplying oil to an oil access port located on the aft core cowl of the engine; and transporting the oil using gravitational force from the oil access port through an oil tank filling pipe that leads to a tank filling port, located at or adjacent an oil tank bottom of an oil tank located within the core of the engine, and into the oil tank.

In a third aspect, there is provided a gas turbine engine that includes the oil tank filling system of the first aspect.

The gas turbine engine may be for an aircraft wherein the gas turbine engine comprises an engine core comprising a turbine, a compressor, and a core shaft connecting the turbine to the compressor; a fan located upstream of the engine core, the fan comprising a plurality of fan blades; and a gearbox that receives an input from the core shaft and outputs drive to the fan so as to drive the fan at a lower rotational speed than the core shaft.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

The term "core" or "core engine" as used herein means the part of a gas turbine engine that houses the compressor(s), combustor(s), turbine(s), and the core shaft(s) that connect the turbine(s) to the compressor(s). The core is typically contained within an engine nacelle.

Throughout this specification and in the claims that follow, unless the context requires otherwise, the word "comprise" or variations such as "comprises" and "comprising", will be understood to imply the inclusion of a stated integer or group of integers but not the exclusion of any other stated integer or group of integers.

BRIEF DESCRIPTION OF THE DRAWINGS

Embodiments will be described by way of example only with reference to the accompanying drawings. In the drawings.

Figure 1:
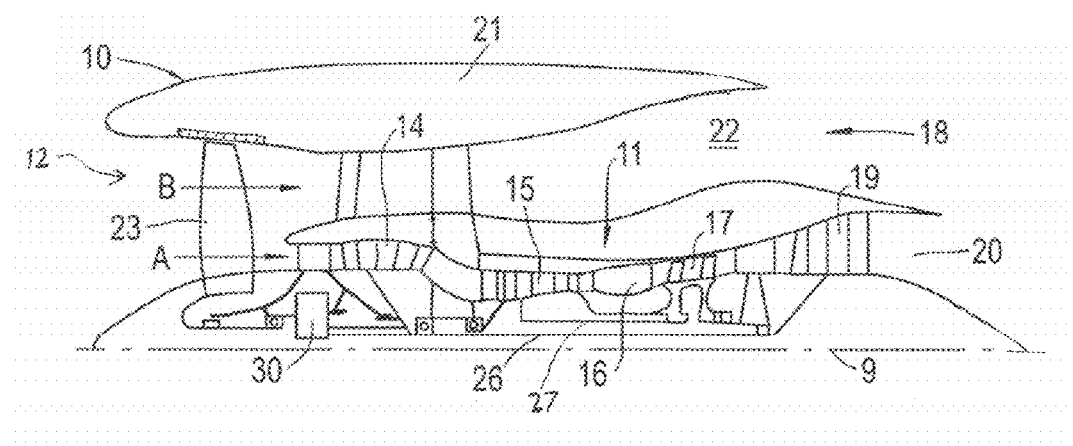
FIG. 1 is a sectional side view of a gas turbine engine.

The following table lists the reference numerals used in the drawings with the features to which they refer:

| Ref no. | Feature | FIG. |
|---|---|---|
| A | Core airflow | 1 |
| B | Bypass airflow | 1 |
| 9 | Principal rotational axis (of engine) | 1, 2 |
| 10 | Gas turbine engine | 1, 4 |
| 11 | Core | 1, 4 |
| 12 | Air intake | 1, 4 |
| 14 | Low pressure compressor | 1 |
| 15 | High pressure compressor | 1 |
| 16 | Combustion equipment | 1 |
| 17 | High pressure turbine | 1 |
| 18 | Bypass exhaust nozzle | 1 |
| 19 | Low pressure turbine | 1 |
| 20 | Core exhaust nozzle | 1 |
| 21 | Fan nacelle or fan case | 1, 4 |
| 22 | Bypass duct | 1, 4 |
| 23 | Fan | 1, 2, 4 |
| 24 | Stationary supporting structure | 2 |
| 26 | Shaft | 1, 2 |
| 27 | Interconnecting shaft | 1 |
| 28 | Sun wheel or sun gear | 2, 3 |
| 30 | Epicyclic gear arrangement | 1, 2, 3 |
| 32 | Planet gears | 2, 3 |
| 34 | Planet carrier | 2, 3 |
| 36 | Linkages | 2 |
| 38 | Sun gear | 2, 3 |
| 40 | Linkages | 2 |
| 50 | Oil tank filling system | 4 |
| 52 | Oil tank | 4 |
| 55 | Oil access port | 4 |
| 56 | Oil tank filling pipe | 4 |
| 57 | Oil filling level | 4 |
| 58 | Tank filling port | 4 |
| 62 | Engine nacelle | 4 |
| 64 | Outlet guide vane (OGV) | 4 |
| 66 | Oil tank top | 4 |
| 68 | Oil tank bottom | 4 |
| 70 | Lower bifurcation | 4 |
| 74 | Auxiliary gear box | 4 |
| 76 | Sight viewing glass | 4 |

DETAILED DESCRIPTION OF THE DISCLOSURE

The present disclosure relates to an oil tank filling system that is useful, for example, in the gas turbine engine of an aircraft.

Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed). In some alternative embodiments the core shaft may receive drive from a turbine without the core shaft also being connected to a compressor.

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

In some embodiments, the or each turbine may be a centrifugal turbine.

In some embodiments, the or each compressor may be a centrifugal compressor.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a fan nacelle and/or fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15° C. (ambient pressure 101.3 kPa, temperature 30° C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400 K, 1450 K, 1500 K, 1550 K, 1600 K or 1650 K. The TET at cruise may be in an inclusive range bounded by any two of the values in the previous sentence (i.e. the values may form upper or lower bounds). The maximum TET in use of the engine may be, for example, at least (or on the order of) any of the following: 1700 K, 1750 K, 1800 K, 1850 K, 1900 K, 1950 K or 2000 K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55° C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

An example of a gas turbine engine for which the oil pipe failure detection system of the present disclosure is useful will now be further described with reference to the some of the drawings.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high pressure compressor 15, combustion equipment 16, a high-pressure turbine 17, a low pressure turbine 19 and a core exhaust nozzle 20. A fan nacelle 21 surrounds the fan case of the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The low pressure turbine 19 drives the low pressure compressor 14 via shaft 26. The fan 23 generally provides the majority of the propulsive thrust. The epicyclic gearbox 30 is a reduction gearbox.

Figure 2:
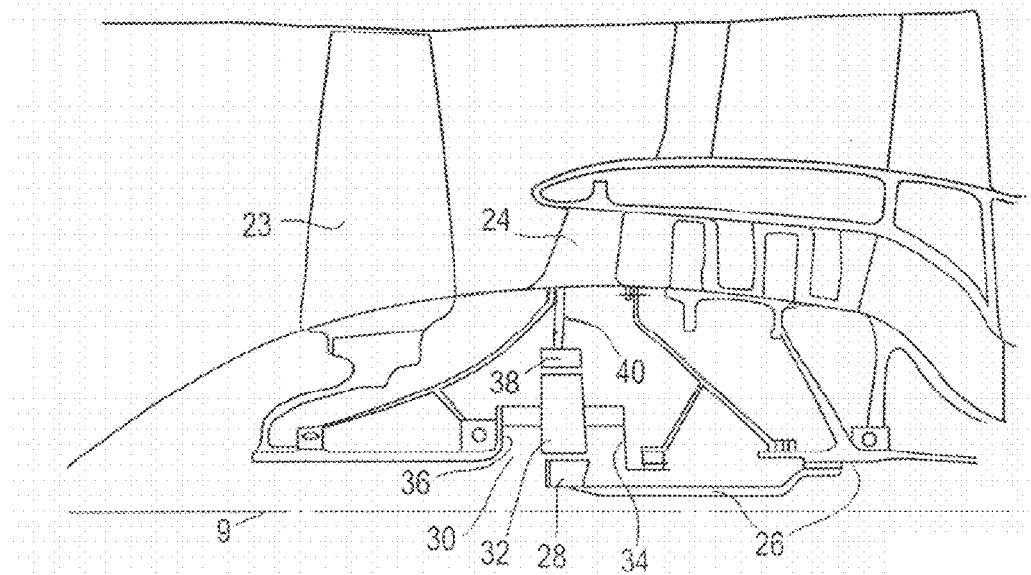
FIG. 2 is a close up sectional side view of an upstream portion of the gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
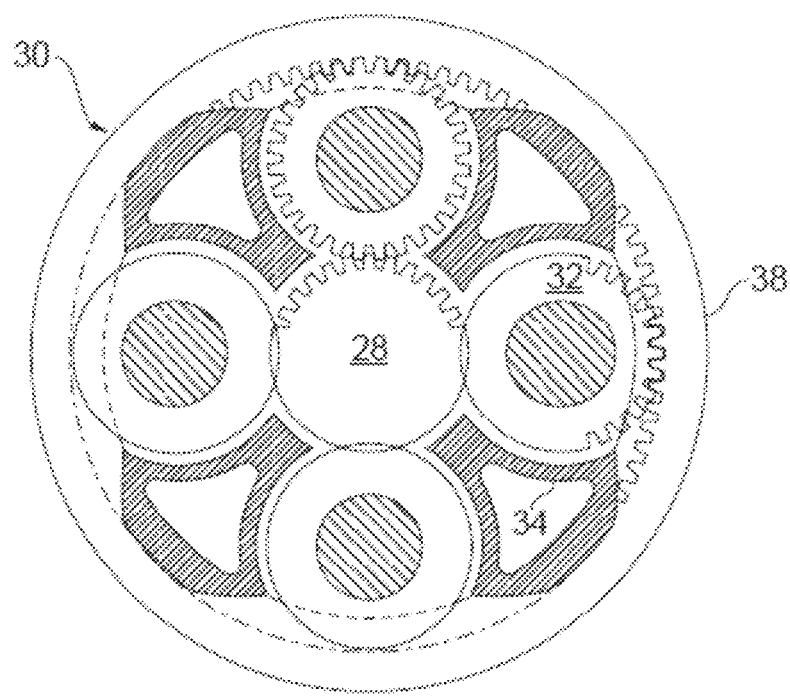
FIG. 3 is a partially cut-away view of a gearbox for the gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32. The planet gears 32 are supported for rotation on bearings. The bearings may be of any suitable kind, such as journal bearings or rolling element bearings.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a fan nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Turning now more specifically to the oil tank filling system of the present disclosure that may be used in such a gas turbine engine. The system will be described with reference to FIG. 4.

In broad terms the oil tank filling system 50 comprises an oil tank 52, an oil access port 55, an oil tank filling pipe 56, and a tank filling port 58.

The oil tank 52 is located within the core 11 of the engine 10, the core being housed within an engine nacelle 62. The oil tank will have restricted access by being within the core of the engine. However even that part of the engine nacelle 62 that is adjacent or closest to the oil tank 52 may have restricted access by virtue of the presence of surrounding engine structures such as outlet guide vanes 64 or other equipment and/or components so that an oil inlet formed in that part of the engine nacelle 62 would be very difficult and/or potentially hazardous to be accessed by a maintenance engineer equipped with a simple oil can. As mentioned above, such access can be especially restricted within the core engine of a large turbofan engine where the large size of the fan requires a large fan case and other design considerations mean certain equipment is best located on the relevant part of the core.

The oil tank 52 can take a variety of shapes and configurations for the engine concerned. For example the oil tank may be shaped to curve around one or both sides of the engine 10 within the core 11 of the engine. Such an oil tank may be located between outlet guide vanes 64 on opposing parts of the core.

Figure 4:
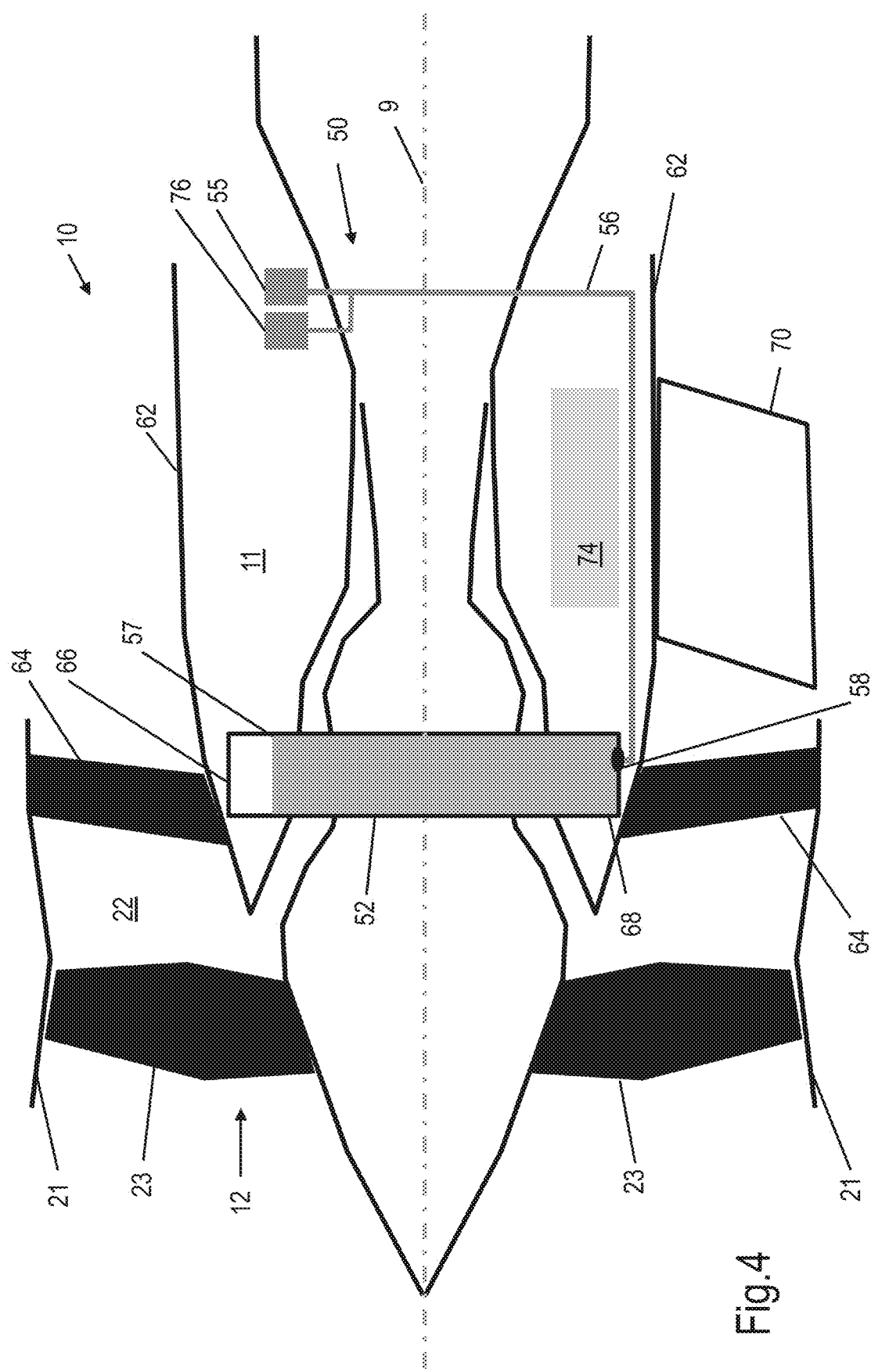
FIG. 4 is a schematic sectional view of a geared turbofan engine showing an embodiment of the oil tank filling system of the present disclosure.

In FIG. 4 the oil tank 52 is shaped to curve around one side of the engine 10 within the core 11 of the engine. The oil tank 52 has an oil tank top 66 located near the top or uppermost part of the core 11 and an oil tank bottom 68 located near the bottom or lowermost part of the core 11. Access to the oil tank top 66 of the oil tank 52 is restricted by being located within the core 11 of the engine and being located directly beneath an outlet guide vane 64. Similarly access to the oil tank bottom 68 of the oil tank 52 is restricted by being located within the core 11 of the engine and being located directly above an outlet guide vane 64.

In the oil tank filling system 50 of the present disclosure access to the oil tank 52, more specifically the oil tank bottom 68, is obtained via the tank filling port 58 that is located at or adjacent the oil tank bottom 68, for example within or adjacent a base of the oil tank 52. In the embodiment shown in FIG. 4, the tank filling port 58 is formed in the base of the oil tank 52.

The oil tank filling system includes an oil access port 55 through which the oil tank filling system can be charged with oil. The oil access port 55, which can take various suitable forms, is located on the aft cowl of the engine, which is readily accessible to a maintenance engineer. This enables the filling of the oil tank 52 that is located in a part of the engine that is not readily accessible to a maintenance engineer. In other words, the oil tank filling system of the present disclosure provides for a generally inaccessible oil tank 52 to be filled remotely from a readily accessible oil access port 55.

The location of the oil access port 55 with respect to the oil tank may determine or at least influence the volume of oil that can be added to the oil tank 52. This is because, in general, when relying on gravity alone to transport oil through the oil tank filling system of the present disclosure, the oil of level in the oil tank 52 cannot be higher than the level of oil in the oil access port 55 when the oil tank filling pipe 56 is full. For example, in the oil tank filling system 50 that is shown in FIG. 4, the oil filling level 57 in the oil tank 52 is level with the oil access port 55. The system is therefore full of oil although the oil tank itself is not completely full of oil.

An air release valve (not shown) may be provided in the oil tank top 66 to release air that might accumulate in the oil tank 52 and reduce the available volume of oil in the oil tank 52.

A pressure balancing or anti-siphoning pipe (not shown) may connect the oil access port 55 and the oil tank 52 to the balance the air pressure between the oil access port 55 and the oil tank 52 (i.e. more especially within the oil tank top 66 above the oil filling level 57).

In some embodiments the oil is provided into the oil access port 55 by simply pouring oil from an oil can or similar receptacle into the oil access port 55. This can be undertaken by a maintenance engineer armed with such an oil can or similar receptacle but as the oil access port 55 is located on the aft core cowl of the engine it will generally be necessary for the maintenance engineer to use a set of steps or be raised on a platform to do this.

In other embodiments the oil is provided into the oil access port 55 via a suitable, detachably connectable, oil supply apparatus. Such an oil supply apparatus may include a pump.

In the oil tank filling system of the present disclosure the oil access port 55 provides access for the oil to the oil tank filling pipe 56 that leads to the tank filling port 58 that is located on or adjacent the oil tank bottom 68 of the oil tank 52.

The oil tank filling pipe 56 can take various suitable forms. It may be dedicated to its function of providing a suitable passageway for oil to flow between the oil access port 55 and the tank filling port 58. However, alternatively the oil tank filling pipe 56 may be formed by using pipe work that already exists within the engine for one or more other purposes but is configured or is configurable to function as the oil tank filling pipe 56. This minimises the need for dedicated piping e.g. the oil tank filling pipe 56 "Ts" into a line between the oil access port 55 and the oil tank 52. This assists in reducing the weight of the engine thereby increasing the efficiency of the engine and reducing specific fuel consumption (SFC).

One or more temperature and/or pressure sensors (not shown) may be provided alongside one or more sections of the oil tank filling pipe 56 and communicate with a controller (not shown) to provide an alert should the oil tank filling pipe 56 burst or become blocked.

If required or desired, one or more check valves (not shown) may be provided along the oil tank filling pipe 56 to prevent oil from flowing back through the oil pipe. However for reasons to be explained such check valves are generally not required.

The tank filling port 58 can take various forms. It is located at or near the bottom 68 of the oil tank 52 and the system relies on gravity so that when oil is poured into the oil access port 55 it flows down and through the oil tank filling pipe 56 and the through the oil tank filling port 58 into the oil tank to and fill the tank as needed. In some embodiments the tank filling port 58 is located within or adjacent a base of the oil tank 52. In the embodiment shown in FIG. 4, the tank filling port 58 is formed in the base of the oil tank 52. However on other embodiments the tank filling port 58 is formed elsewhere in the oil tank bottom 68, for example in a side of the oil tank near the base of the oil tank 52.

The oil tank filling system is configured so that oil that is supplied to the oil access port 55 flows to and into the oil tank 52 using gravitational force. This is at least in part achieved by the oil access port 55 being located in the aft core cowl, particularly in the upper portion the engine nacelle 62 that houses the core 11 of the engine, especially approaching the top of that the engine nacelle 62, and the tank filling port 58 being located at or adjacent oil tank bottom 68 of the oil tank 52 of the engine. The oil tank filling pipe 56 and the tank filling port 58 may be designed, constructed and positioned to facilitate a smooth gravity lead passage of oil through the oil tank filling system.

While the oil tank filling system relies on gravity to transport oil through the system and into the oil tank, the oil tank filling system may include an oil pump (not shown) that can be activated to pump oil through the oil tank filling pipe and the tank filling port and into the oil tank. This may reduce the time needed to fill the tank.

The oil tank filling system may be configured to circulate at least a portion of the oil around at least a part of the oil tank filling system on a periodic or even continual basis to avoid oil stagnating within the system. If the gas turbine engine includes an auxiliary gear box (AGB) 74 that powers a main engine oil pump, then the spill flow from that pump may be directed via the oil tank filling system to avoid stagnation.

The oil pump can take various suitable forms and be located in various suitable parts of the engine to fulfil its function. In some embodiments the oil pump may be an auxiliary pump for an auxiliary oil system.

The oil tank filling system may include an oil pump controller (not shown) that controls the operation of the oil pump in the filling of the oil tank 52.

The oil tank filling system of the present disclosure may include a sight viewing glass 76 that shows or indicates the level of oil in the oil tank 52.

The sight viewing glass 76 can take various suitable forms and be located in various suitable parts of the engine to fulfil its function.

The sight viewing glass 76 may, for example, be located to be visible through an access panel on the aft core cowl and communicate with the oil tank filling pipe 56 to visually alert when oil is backing up the oil filling tank pipe. Sighting oil backing up the oil filling tank pipe indicates the oil tank 52 is almost full or is at least approaching its predetermined optimal volume for filling the tank rather than the total available volume of the oil tank.

In some embodiments, the sight viewing glass 76 may provide visual access to a portion of the sight viewing glass that includes a transparent window so that a maintenance engineer can see through the sight viewing glass 76 and the transparent window when oil is backing up the oil filling tank pipe.

In some embodiments, the sight viewing glass 76 itself provides the transparent window into the oil tank filling pipe 56.

In some embodiments the sight viewing glass 76 is located to be visible through an access panel on the aft core cowl adjacent the oil access port 55 and communicates with the oil tank filling pipe 56 so that the level shown through the sight viewing glass reflects that of the oil in the oil tank 52. In such case the sight viewing glass 76 will generally be located on the same level (i.e. with respect to the horizon, orientated in use) as the oil access port 55. In some embodiments the sight viewing glass 76 may be located alongside the oil access port 55. In other embodiments the sight viewing glass 76 may be spaced apart from the oil access port 55 with suitable piping providing communication between them.

In some embodiments the oil access port 55 and the sight viewing glass 76 may be positioned to be outboard of a matrix cooler i.e. to take advantage of the cooler's presence to shield it from radiation from the core, more specifically casings of the core.

An oil level sensor may be provided in the oil tank 52 that communicates with a controller (not shown) in the engine to provide an alert when there is a predetermined volume of oil in the oil tank. The predetermined volume of oil may be an optimal volume for filling the tank rather than the total available volume of the oil tank. The alert may, for example, be visual and/or aural.

A plurality of oil level sensors may be provided that communicate with the controller to provide various alerts at predetermined points in the tank filling process. The alerts may, for example, be visual and/or aural.

One or more oil quality sensors may be provided in the oil tank 52 or in the oil tank filling pipe 56 that measure the quality of the oil within the oil tank 52 or the oil tank filling pipe 56. Such oil quality sensor or sensors can take a variety of suitable forms and may communicate with an oil quality controller (not shown) that informs the maintenance engineer and/or the pilot as to the quality of the oil currently within the oil tank and/or the oil tank filling system. Due to the relative inaccessibility of the oil tank 52, an oil quantity transmitter placed in the feed pipe 56 provides in-flight indication of tank oil level in a location which allows a more rapid replacement of the unit in the event of a unit failure.

As mentioned above, one or more check valves (not shown) may be provided along the oil tank filling pipe 56 to prevent oil from flowing back through the oil pipe. However such check valves may not be desirable for embodiments that rely on the sighting of oil backing up the oil filling tank pipe 56 to indicate that the oil tank 52 is almost full or is at least approaching its predetermined optimal volume for filling the tank rather than the total available volume of the oil tank.

In use, a maintenance engineer supplies oil to an aircraft on the tarmac that requires its oil tank to be filled or simply topped up in preparation for a flight. The maintenance engineer supplies the oil into the oil access port 55 of the oil tank filling system 50. The oil access port 55 is located on the aft core cowl of the engine. The oil flows from the oil access port 55 through the oil tank filling pipe 56 towards the tank filling port 58 that is formed in the oil tank bottom 68. The oil flows into the oil tank 52 to fill the oil tank. The oil tank filling system is configured so that oil that is supplied to the oil access port 55 flows to and into the oil tank using gravitational force.

As mentioned above, the present disclosure also provides a method of filling the oil tank of a gas turbine engine that includes an aft core cowl. The method comprises the steps of: supplying oil to the oil access port 55 located on the aft core cowl of the engine; and transporting the oil using gravitational force from the oil access port 55 through the oil tank filling pipe 56 that leads to a tank filling port 58, located at or adjacent the oil tank bottom 68 of the oil tank 52 located within the core 11 of the engine, and into the oil tank 52.

The method enables a maintenance engineer to fill an oil tank 52 to which access is restricted, for example by the fan nacelle 21, the fan case that is covered by the fan nacelle, one or more outlet guide vanes 64 or simply by being located within the core engine. The method also enables a generally inaccessible oil tank 52 to be filled remotely from a readily accessible oil access port 55.

The present disclosure also provides a gas turbine engine that includes the oil tank filling system 50 of the present disclosure.

That gas turbine engine can take many suitable forms, for example the gas turbine engine may be for an aircraft wherein the gas engine comprises an engine core comprising a turbine, a compressor, and a core shaft connecting the turbine to the compressor; a fan located upstream of the engine core, the fan comprising a plurality of fan blades; and a gearbox that receives an input from the core shaft and outputs drive to the fan so as to drive the fan at a lower rotational speed than the core shaft.

The oil tank filling system of the present disclosure is especially useful when the gas turbine engine is a turbofan engine that has a large fan and therefore a large fan case and a large fan nacelle that restricts access to the core of the engine, particularly above or below one or more outlet guide vanes on the core engine.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A gas turbine engine that includes a core, an aft core cowl, and an oil tank filling system, the oil tank filling system comprising:
    an oil tank that has an oil tank top and an oil tank bottom and is located within the core of the gas turbine engine;
    an oil access port located on the aft core cowl, wherein oil is supplied to the oil access port;
    an oil tank filling pipe that leads from the oil access port to a tank filling port located at or adjacent the oil tank bottom; and
    a sight viewing glass configured to show or indicate a level of oil in the oil tank; wherein the sight viewing glass is located on the aft core cowl and communicates with the oil tank filling pipe to visually alert when oil is backing up the oil tank filling pipe;
    the oil tank filling system being configured so that oil that is supplied to the oil access port flows to and into the oil tank using gravitational force.

2. The gas turbine engine of claim 1 wherein the oil tank is shaped to curve around the gas turbine engine within the core of the gas turbine engine.

3. The gas turbine engine of claim 1 further comprising outlet guide vanes, wherein the oil tank is located between opposing ones of the outlet guide vanes.

4. The gas turbine engine of claim 1 wherein the sight viewing glass is located to be visible through an access panel on the aft core cowl adjacent the oil access port.

5. The gas turbine engine of claim 1 wherein the oil access port and the sight viewing glass are positioned to be outboard of a matrix cooler.

6. The gas turbine engine of claim 1 further comprising a turbine, a compressor, and a core shaft connecting the turbine to the compressor; a fan located upstream of the core, the fan comprising a plurality of fan blades and a gearbox that receives an input from the core shaft and outputs drive to the fan so as to drive the fan at a lower rotational speed than the core shaft, wherein the gas turbine engine is for use on an aircraft.

7. A method of filling an oil tank of a gas turbine engine that includes a core and an aft core cowl, the method comprising the steps of:
    supplying oil to an oil access port located on the aft core cowl of the gas turbine engine;
    transporting the oil using gravitational force from the oil access port through an oil tank filling pipe that leads to a tank filling port, located at or adjacent an oil tank bottom of the oil tank located within the core of the gas turbine engine, and into the oil tank; and
    providing a sight viewing glass configured to show or indicate a level of oil in the oil tank, wherein the sight viewing glass is located on the aft core cowl and communicates with the oil tank filling pipe to visually alert when oil is backing up the oil tank filling pipe.

* * * * *